United States Patent
Huynh-Ba et al.

(10) Patent No.: US 7,157,536 B2
(45) Date of Patent: Jan. 2, 2007

(54) COATING COMPOSITION FOR AMBIENT CURE CONTAINING AN ALKOXYLATED AMINE

(75) Inventors: Gia Huynh-Ba, Hockessin, DE (US); Patrick Henry Corcoran, Cherry Hill, NJ (US); Carl Brent Douglas, Boothwyn, PA (US); Christian Peter Lenges, Wilmington, DE (US); John Stuart Coates, Elkton, MD (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 332 days.

(21) Appl. No.: 10/760,780

(22) Filed: Jan. 19, 2004

(65) Prior Publication Data

US 2005/0159537 A1 Jul. 21, 2005

(51) Int. Cl.
*C08F 232/08* (2006.01)

(52) U.S. Cl. .......................... 526/280; 528/53; 528/58; 528/67; 528/73; 528/75; 528/80; 528/83; 525/440; 525/453; 525/458; 526/281

(58) Field of Classification Search ................. 525/123, 525/131, 440, 453, 458, 58; 528/49, 53, 528/58, 67, 73, 75, 80, 83; 526/280, 281
See application file for complete search history.

(56) References Cited

U.S. PATENT DOCUMENTS

| | | | |
|---|---|---|---|
| 2,697,118 A | 12/1954 | Lundsted et al. | |
| 3,535,378 A | 10/1970 | Cross et al. | |
| 4,523,003 A | 6/1985 | Bezwada | |
| 4,677,029 A | 6/1987 | Frisch et al. | |
| 5,114,988 A | 5/1992 | Gagnon et al. | |
| 6,222,075 B1 | 4/2001 | Ihrig et al. | |
| 6,359,059 B1 | 3/2002 | Shepler et al. | |
| 6,433,085 B1 * | 8/2002 | Huynh-Ba | 525/123 |
| 6,472,493 B1 * | 10/2002 | Huynh-Ba | 528/49 |
| 6,677,425 B1 * | 1/2004 | Huynh-Ba | 528/49 |
| 6,680,356 B1 * | 1/2004 | Huynh-Ba | 525/131 |
| 6,703,452 B1 * | 3/2004 | Huynh-Ba | 525/453 |
| 6,780,908 B1 * | 8/2004 | Huynh-Ba | 524/285 |
| 2002/0132934 A1 | 9/2002 | Huynh-Ba | |
| 2003/0017331 A1 | 1/2003 | Okochi et al. | |
| 2005/0159625 A1 | 7/2005 | Coates et al. | |

FOREIGN PATENT DOCUMENTS

| | | |
|---|---|---|
| EP | 1 426 392 A1 | 6/2004 |
| EP | 1 167 412 B1 | 7/2005 |

OTHER PUBLICATIONS

DeSousa et al., "Effect of Cyclohexylene Bridges on the Metal Ion Size Based Selectivity of Ligands in Aqueous Solution", Pure, Appl. Chem., 1986, 58, 1445, pp. 3525-3529.

Weigert, Dimerizations of Electronegatively Substituted Dienes, J. Org. Chem., vol. 42, No. 24, 1977, pp. 3859-3863.

* cited by examiner

*Primary Examiner*—Robert D. Harlan

(57) ABSTRACT

A composition that can be used as a component in auto clear coat and primer is disclosed. The composition comprises or is an alkoxylated amine having the formula of $(A)[N(R_1H)_2]_p$ including an isomer or mixture of isomers thereof. Also disclosed is a process, which comprises contacting an amine with an epoxide under a condition sufficient to produce an alkoxylated amine. Further disclosed is a composition that can be used as coating composition and primer, which comprises an alkoxylated amine and an organic polyisocyanate.

14 Claims, No Drawings

COATING COMPOSITION FOR AMBIENT CURE CONTAINING AN ALKOXYLATED AMINE

FIELD OF THE INVENTION

The invention relates to an alkoxylated amine such as ethoxylated amine, and in particular to coating compositions containing such amines which are especially useful for clear coating over a colored base coat.

BACKGROUND OF THE INVENTION

An alkoxylated amine such as, for example, ethoxylated amine can be used, for example, as polyol components in fast-drying polyurethane clear coats and primers in auto refinish. Rapid curing of clear coats and primers in automotive refinishing is very important in automotive paint shop productivity. Therefore, a seemingly very small improvement in shortening the curing time can translate into a substantial productivity improvement. Accordingly, development of a new product that can improve the productivity is a great contribution to the art.

SUMMARY OF THE INVENTION

A composition that can be used as a component in auto clear coat and primer is provided which comprises or is an alkoxylated amine having the structure of $(A)[N(R^1H)_2]_p$ (Formula (I)) including an isomer or mixture of isomers thereof.

The invention further provides a coating composition comprising a film forming binder and an organic liquid carrier, wherein the binder contains (a) a nucleophilic component which comprises an alkoxylated amine, having the general structure of Formula (I) or isomer or mixture of isomers thereof wherein (A) in Formula (I) has either the general structure of Formula (II) or isomer or mixture of isomers thereof or the general structure of Formula (III) or isomer or mixture of isomers thereof and (b) an electrophilic component which comprises an organic polyisocyanate. The alkoxylated amine can make up 100 wt. % of the nucleophilic component or optionally can be blended with other polyol components such as a hydroxyl functional acrylic polymer or a hydroxyl-terminated ester oligomer. The use of a catalyst to assist the cure process is optional.

DETAILED DESCRIPTION OF THE INVENTION

Any formula referred to in the invention, unless otherwise indicated, includes any isomer or mixtures of two or more isomers of the formula.

The invention provides a composition that can be used as a component in coating formulations, especially clear coats and primers useful in automotive refinishing.

The composition comprises an alkoxylated amine $(A)[N(R^1H)_2]_p$ (Formula (I)) wherein p is a number from 2 to 6, preferably 2 to 3 or mixture of 2 and 3;

each $R^1$ is independently $[-CHR^2-CHR^3-O-]_n$ with n equal to 1, 2, 3 or 4;

$R^2$ and $R^3$ are each independently H, a $C_1$ to $C_{20}$ alkyl group, a phenyl group, a $C_6$ to $C_{20}$ aryl group substituted with a $C_1-C_{12}$ alkyl group, a $-CH_2-O-R^4$ group with $R^4$ equal to a $C_1-C_{12}$ alkyl group or a phenyl group, or $R^2$ and $R^3$ are connected and form a cycloaliphatic group by an alkylene chain $(-(CH_2)_q-, q=3$ to 16);

(A) comprises a cycloaliphatic fragment having the structure of (1) Formula (II) below or isomer or mixture of isomers thereof, (2) Formula (III) below or isomer or mixture of isomers thereof, or (3) mixtures of (1) and (2);

Formula (II) has the structure of

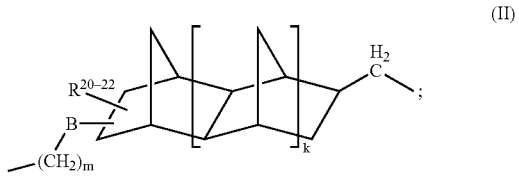

wherein p in Formula (I) is equal to 2;

the exact point of attachment and orientation of the $-CH_2-$ group (which also connects to an amine nitrogen atom in Formula (I)) and the $R^{20}$, $R^{21}$, and $R^{22}$ groups to the norbornane skeleton can vary and mixtures of compounds and isomers are commonly utilized by this invention;

the $-(CH_2)_m-$ group in Formula (II) attaches to an amine nitrogen atom in Formula (I);

k equals 0, 1 or 2 and, when k equals 1 or 2, the additional bridging $CH_2$ group(s) may be on the same or opposite side with respect to the first bridging $CH_2$ group;

$B=(-(CH_2)_t-(CH)-(CH_2)_s-)_r$, r=0 or 1, s+t=1 to 16, the $-(CH)-$ group also connects to $-(CH_2)_m-$; when r=1, B forms a ring connecting to the norbornane skeleton in place of one of $R^{20}$, $R^{21}$ or $R^{22}$;

$R^{20}$, $R^{21}$, and $R^{22}$ can be the same or different and are each independently H, a $C_1$ to $C_{20}$ alkyl group, or a phenyl group; and m=1, 2, 3, or 4;

Formula (III) has the structure of

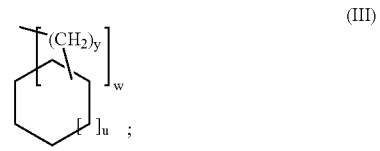

the exact point of attachment to the cycloaliphatic ring and the orientation of each $-(CH_2)_y-$ group, each of which also connects to an amine nitrogen atom, with respect to each other can vary and mixtures of compounds and isomers are commonly utilized in this invention;

u=1–11, preferably 1–7;

w=2–6, preferably 2 or 3;

y=0–5; and if u=1, w=2, y≠1; and if u=1, w=2, y=0, $R^2$ or $R^3$ or both cannot be H, $CH_3$, $C_2H_5$, $CH_2(CH_2)_kCH_3$ with k=1–5, or $C_6H_{11}$;

Examples of suitable Formula (III) include those having u=1, w=3, and y=3 or u=2 or 3, w=2, and y=1.

Exemplary Formula (II) is Formula (IV) shown below where r=0 and m=1, 2, or 3.

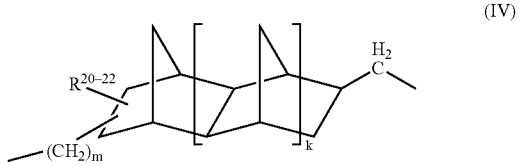

Exemplary alkoxylated norbornane methylene amines comprising Formula (IV) include those represented by Formulae (V)–(X) as shown below.
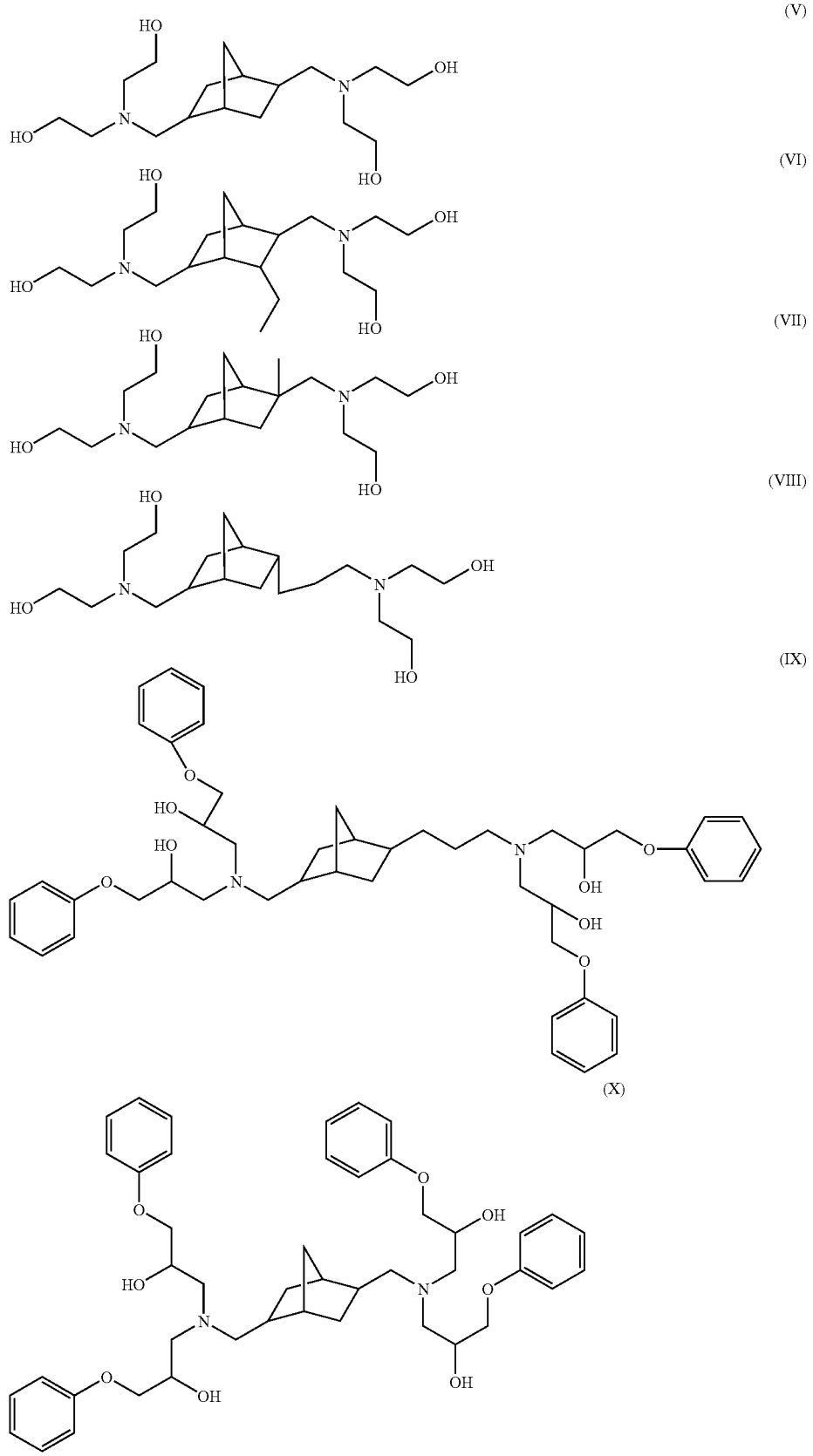

Examples of alkoxylated amines comprising Formula (II) include compounds shown below in Formulae (XI) and (XII).

(XI)

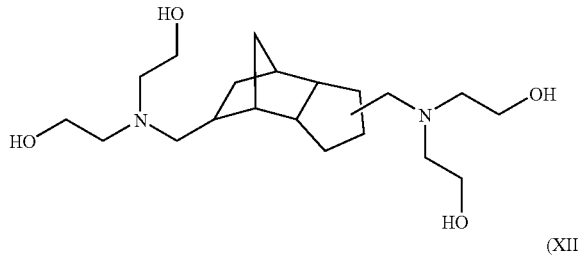

(XII)

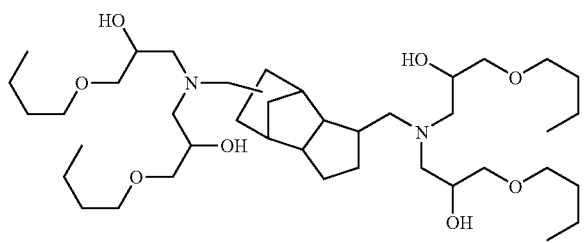

Formulae (XI) and (XII) are defined by Formula (II) where k=0 and r=1, and s+t=2, in which B forms a ring connecting back to the norbornane skeleton in place of one of $R^{20}$, $R^{21}$ or $R^{22}$; and the remaining $R^{20}$, $R^{21}$ or $R^{22}$ are each H. In Formula (XII), one of $R^2$ or $R^3$ for each $R^1$ group in Formula (I) equals a —$CH_2O$—$R^4$— group and $R^4$ equals an n-butyl group.

Formula (XIII) illustrates exemplary compounds comprising Formula (III) where u=3, w=2, and y=1.

(XIII)

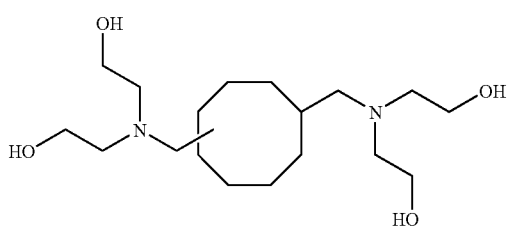

Formula (XIV) represents exemplary compounds comprising Formula (III) where u=1, w=3, and y=3.

(XIV)

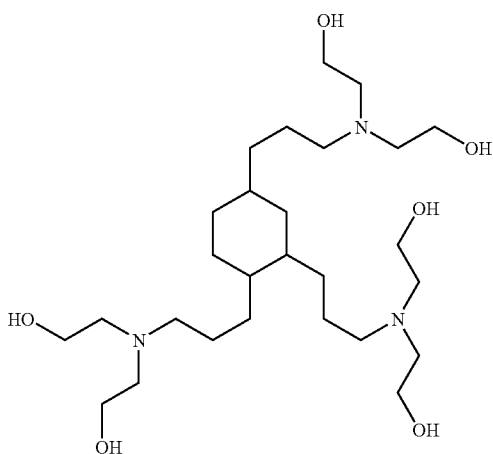

Formula (XV) shown below is an exemplary compound where u=1, w=2, and y=0, with the proviso that $R^2$ and $R^3$ both each in Formula (I) cannot be H, $CH_3$, $C_2H_5$, $CH_2(CH_2)_kCH_3$ with k=1-5, or $C_6H_{11}$;

(XV)

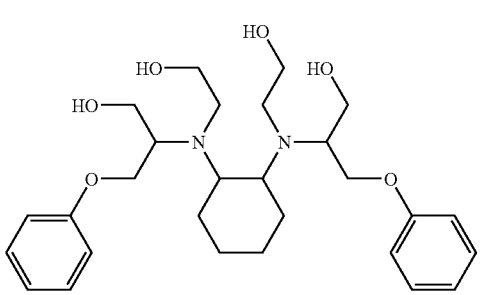

The alkoxylated amine composition of the invention can be produced by any means known to one skilled in the art such as those disclosed in U.S. Pat. Nos. 2,697,118, 6,222,075, disclosure of which is incorporated herein by reference. Hancock describes in *Inorganic Chemistry* (1991), 30(18), pp. 3525–9, the reaction of trans-1,2-diamino-cyclohexane with ethylene oxide disclosure of which is incorporated herein by reference.

However, it is preferred to produce the composition of the invention by the process disclosed below.

The process for producing an alkoxylated amine comprises contacting a cycloaliphatic amine, or amine substrate, with an epoxide at a temperature in the range of from, about 50° C. to about 150° C., preferably about 80° C. to about 110° C., under a pressure that can accommodate the temperature range, preferably in the range of from about 50 to about 10,000 kPa for a period of from about 1 minute to about 72 hours. Thereafter, the resulting product can be cooled to ambient temperature such as room temperature (about 25° C.).

As indicated above, cycloaliphatic amine compounds are used as starting materials for the compounds of this invention. To produce structures of Formula (II), these starting materials may contain, for example, a methyleneamine substituted norbornane (bicyclo[2.2.1]heptane) fragment. This amine fragment can be prepared in a hydrogenation process as described in the concurrently filed U.S. patent application Ser. No. 10/760778, filed Jan. 19, 2004. The starting material for this methylene amine compound is a norbornane nitrile derivative which can be prepared as described in the concurrently filed U.S. patent application Ser. No. 10/760779, filed Jan. 19, 2004. The entire disclosures of these applications are incorporated herein by reference.

To make structures of Formula (III), these starting materials may contain, for example, 1,2-cyclohexanediamine which is commercially available or methyleneamine substituted cyclooctanes which can be prepared as described by Weigert et al. in *Journal of Organic Chemistry* (1977), 42(24), 3859–63. These starting materials may also contain, for example, 1,2,4-tris-n-propylamine-cyclohexane. This amine fragment can be prepared in a hydrocyanation/hydrogenation process as described in filed U.S. patent application Ser. No. 10/322273, filed Dec. 18, 2002.

If volatile epoxides (such as ethylene oxide) are used as the epoxide, the reaction mass may be held at the reaction temperature to allow any residual epoxide to degas and to escape from the reactor after the addition of epoxide to the reaction mixture has been stopped. Alternatively, vacuum may be applied to remove excess epoxide. Typically, the amount of epoxide added to the reaction mixture is closely monitored to adjust the ratio of mole equivalents of epoxide added to the amine substrates. Although preferably, the target stoichiometry for the addition of epoxide to the amine group is two to one (2:1), products derived from over addition as well as under addition are within the scope of this invention.

The reaction of the amine substrate with the epoxide can be carried out with or without a solvent. The solvent, if used, should be liquid at the reaction temperature and pressure and inert towards the amine substrate and the epoxide substrate. Examples of suitable solvents include hydrocarbons such as benzene, xylene, or combinations thereof; ethers other than epoxides such as tetrahydrofuran (THF), nitriles such as acetonitrile, adiponitrile; alcohols such as butanol, pentanol; or combinations of two or more thereof. The cycloaliphatic amine may itself serve as the solvent.

The reaction of the amine substrate with the epoxide may be carried out with or without a catalyst. Examples of typical catalysts include carboxylic acids such as acetic acid, salicylic acid; and Lewis acids such as $BF_3$, $Sc(OTf)_3$ (with OTf equal to the triflate anion).

The process can be carried out batch-wise, semi-continuously, or continuously, depending on one's preference in any suitable vessel known to one skilled in the art such as, for example, plug-flow reactors or in a cascade of stirred tank reactors. If the amine substrate is used directly without a solvent, the use of a cascade of stirred tank reactors is an especially effective configuration.

Any epoxide can be used in the process for producing the desired amine composition. Examples of suitable epoxides include, but are not limited to, ethylene oxide, propylene oxide, butylene oxide, octylene oxide, 3-phenoxy-1,2-epoxypropane, 3-n-butoxy-1,2-epoxypropane, epoxycyclohexane and combinations of two or more thereof. Preferred epoxides are ethylene oxide, butylene oxide and 3-phenoxy-1,2-epoxypropane.

The present invention further provides a low VOC (volatile organic content) coating composition (VOC content of less than 5 lbs per gallon; preferably in the range of 2.1–4.4 lbs per gallon, as determined by ASTM D-3960) which is particularly suited for use as a clear coat in automotive refinishing. The composition contains a film forming binder and an organic liquid carrier, which is usually a solvent for the binder. The binder comprises two components. The first component is a nucleophilic component (commonly referred to as a polyol component) comprising an alkoxylated amine having the general structure of Formula (I) wherein (A) has either the general structure of Formula (II) or (III), all of which are described hereinabove. The second component is an electrophilic component (also referred to as a crosslinking component or agent) comprising an organic polyisocyanate.

The forgoing alkoxylated amine used in the nucleophilic component of the binder is a special molecule, not only capable of speeding up the cure at ambient temperatures without solvent entrapment in the dried clear coat film, but also causes the film to be rather rigid and tough upon curing. This, in turn, enables the film to be buffed and worked on in a very short period of time after application. The applied coating can be dried at ambient temperatures or, alternatively, can be baked at relatively low temperatures, e.g., 35–100° C., for about 15 minutes–2 hours.

The alkoxylated amine may comprise 100% by weight of the nucleophilic component or may optionally be blended with other film-forming polyols, which do not contain a tertiary amine, such as a hydroxyl functional acrylic polymer or a hydroxyl-terminated ester oligomer. The amount of acrylic polymer or ester oligomer is typically about 0% to about 95% by weight of the total reaction mixture of the nucleophilic component.

Acrylic polymers useful in the present invention preferably comprise hydroxyl groups and can be produced by any means known to one skilled in the art such as, for example, solution polymerization of a monomer such as an acrylic acid, or its salt, or its derivative, and optionally a comonomer. Because such polymerization is well known, the description of which is omitted herein for the interest of brevity. A suitable polymer preferably has a weight average molecular weight (Mw) of about 1,000 to about 20,000, more preferably about 3,000 to about 11,000. The acrylic polymer is preferably composed of a mixture of monomers. The preferred monomer is acrylic acid or salt thereof, methacrylic acid or salt thereof, methyl methacrylate, isobornyl methacrylate, cyclohexylmethacrylate, either n-butyl methacrylate, isobutyl methacrylate, ethyl hexyl methacrylate, hydroxyethyl methacrylate, hydroxy propyl methacrylate, hydroxybutyl methacrylate, hydroxy ethyl acrylate, hydroxy propyl acrylate, hydroxybutyl acrylate, or combinations of two or more thereof. The preferred comonomer is styrene, acrylamide, methacrylamide, n-tertiary butyl acrylamide, methacrylamide, or combinations of two or more thereof.

A more preferred acrylic polymer contains repeat units derived from about 5 to about 30% styrene, about 1 to about 50% of a methacrylate disclosed above, about 30 to about 60% of another methacrylate, about 10 to about 40% of a hydroxy alkyl methacrylate, and optionally about 0.5 to about 2% of acrylamide, methacrylamide, n-tertiary butyl acrylamide, methacrylamide, or combinations of two or more thereof, all by weight of the polymer.

Preferred ester oligomers useful in the present invention are hydroxyl-terminated polyesters having a weight average molecular weight (Mw) not exceeding about 3,000 (oligomer), preferably about 200–2,000, and a polydispersity (Mw divided by Mn) of less than about 1.7. Such oligomers are more fully described in U.S. Pat. No. 5,354,797 and Barsotti et al. U.S. Pat. No. 6,221,494.

As the second component, the electrophilic component in the coating formulation, an organic polyisocyanate is used. Any of the conventional aromatic, aliphatic, cycloaliphatic diisocyanates, trifunctional isocyanates and isocyanate functional addition compounds of a polyol and a diisocyanate may be used as the electrophilic component. Trifunctional isocyanates, such as the trimer of hexamethylene diisocyanate or blends of trimers, such as a blend of hexamethylene diisocyanate and isophorone diisocyanate trimers, are generally preferred.

The nucleophilic component containing the alkoxylated amine of this invention as defined above and the second electrophilic component, the organic polyisocyanate, are preferably employed in an equivalent ratio of isocyanate groups to hydroxyl groups of 0.8/1 to 2.0/1. The coating composition may also contain a certain amount of catalyst to assist curing the composition at ambient temperature.

Preferably the catalyst comprises at least one organotin compound, and optionally, at least one organic acid, and optionally at least one tertiary amine free of hydroxyl groups such as a trialkylamine or a trialkylene amine.

Generally, about 0.005–0.2% by weight, based on the total weight of the first and second components and catalyst, of organotin catalyst will be sufficient to impart the desired properties. The organotin catalyst can be used by itself as the sole catalyst ingredient.

The coating composition of this invention may further comprise common additives, such as ultraviolet light stabilizers, screeners, quenchers and antioxidants. Flow control agents may also be added.

When used as a clear coating, it may be desirable to use pigments in the clear coating composition, which have the same refractive index as the dried coating. Typically, useful pigments have a particle size of about 0.015–50 microns and are used in a pigment to binder weight ratio of about 1:100 to 10:100 and are inorganic siliceous pigments such as silica pigment having a refractive index of about 1.4–1.6.

The coating composition of the present invention also contains the customary organic solvents in the organic liquid carrier portion. The amount of organic solvent(s) added depends upon the desired binder level as well as the desired amount of VOC of the composition. Typical organic solvents consist of aromatic hydrocarbons, such as petroleum naphtha or xylenes; ketones, such as methyl amyl ketone, methyl isobutyl ketone, methyl ethyl ketone, or acetone; esters, such as butyl acetate or hexyl acetate; and glycol ether esters, such as propylene glycol monomethyl ether acetate. Examples of solvents which do not contribute to the VOC of the composition include methyl acetate, acetone, 1-chloro, 4-trifluoromethyl benzene, and potentially t-butyl acetate.

The coating composition of this invention is also preferably prepared as a "two-component" or "two-pack" coating composition, wherein the two reactive nucleophilic and electrophilic binder components are stored in separate containers, which are typically sealed. The optional catalyst, organic solvent and usual other additives may be added to either or both the nucleophilic or electrophilic components, depending upon the intended use of the composition. However, these additives (except for some solvent) are preferably added to and stored in the same container with the nucleophilic component. The contents of the nucleophilic and electrophilic component containers are mixed in the desired NCO/OH ratio just prior to use to form the activated coating composition, which has a limited pot life. Mixing is usually accomplished simply by stirring at room temperature just before application: The coating composition is then applied as a layer of desired thickness on a substrate surface, such as an autobody part, including the entire autobody. After application, the layer dries and cures to form a coating on the substrate surface having the desired coating properties. The applied coating can be dried at ambient temperatures or, alternatively, can be baked at relatively low temperatures, e.g., 35–100° C., for about 15 minutes–2 hours.

Generally, the coating composition of this invention is used as a clearcoat in automotive refinishing, but it should be understood that it can also be used as a clearcoat finish or can be pigmented with conventional pigments and used as a primer, a colored monocoat or as a basecoat in a clearcoat/colorcoat finish or refinish.

Advantageously, coatings formed using these coating compositions rapidly become dust-free, within 10 min and even within 5 min, free of water spot damage within 30 min, and can be buffed in less than three hours and possibly as early as one hour after application, all with ambient temperature ambient air drying and cure, without sacrifice in either the ease of applying the coating composition or the ultimate quality of the clear coat. Of course, the film coating becomes tack-free prior to becoming buffable. Thus, the coatings formed using the compositions of the present invention are highly useful for repairing a clearcoat/colorcoat finish of a vehicle using the coating composition as a refinish clearcoat, which process allows the vehicle to be moved outside the paint shop into the open air, to make room for the next vehicle to be painted, and the finish to be sanded (wet or dry), buffed or polished, if necessary, to remove minor imperfections and enhance gloss within a short period of time after application. This greatly improves the productivity of a refinish operation by allowing more vehicles to be processed in the same or in less time.

The coating composition of this invention can be used to paint or repair a variety of substrates such as previously painted metal substrates, cold roll steel, steel coated with conventional primers such as electrodeposition primers, alkyd resin repair primers and the like, plastic type substrates such as polyester reinforced fiber glass, thermoplastic olefin (TPO), reaction injection molded urethanes and partially crystalline polyamides, as well as wood and aluminum substrates. It is preferably used as a clearcoat to quickly repair a clearcoat/colorcoat finish on a vehicle exterior.

Having generally described this invention, a further understanding can be obtained by reference to certain specific examples, which are provided herein for purpose of illustration only and are not intended to be limiting.

EXAMPLES

Example 1–7

General Procedure: A 500 ml 4-neck flask is flushed liberally with nitrogen to remove all traces of oxygen. A neat alkyl diamine was charged to the flask, which was equipped with an agitator, dry-ice cooled condenser, ethylene oxide (EO)/nitrogen delivery tube and a 250° C. immersion thermometer. The stirring amine was heated to at least 80° C. under a gentle flow of nitrogen and a mixture of ethylene oxide and nitrogen was introduced through the delivery tube. EO was added to the reaction mixture either in a subsurface addition or by flowing over the surface of the reaction mixture, both were equally effective. The temperature was slowly raised to between 100 and 105° C. as the addition proceeds. After the required amount of ethylene oxide had been added the EO flow is stopped and the dry-ice condenser was replaced with an air- or water-cooled condenser. The reaction mass was held at the reaction temperature to allow any residual ethylene oxide to degas and escape from the reactor. The reaction mass was cooled to room temperature and the neat ethoxylated diamine was collected. The typical yields of this addition reaction were above 95% of theory. The product was analyzed using gas and liquid chormatographic methods in combination with mass spectroscopy. The target product was the dominant product in the product mixture. Additional products based on the further addition of EO could be observed. Product analyses using LC/MS methodology are shown below.

TABLE I

| Example | Formula | Product Analysis (MW, % in mixture) |
|---|---|---|
| 1 | V | MW: 330, 90.4% |
| 2 | VI | MW: 374, 85.0% |
| 3 | VII | MW: 358, 98.0+% |
| 4 | VIII | MW: 345, 92.3% |
| 5 | XI | MW: 256, 49.6% |
| 6 | XII | MW: 358, 95% |
| 7 | XIII | MW: 402, 58.0% |

Example 8

Under an nitrogen atmosphere, 2,-(5,6)-norbornane-dimethaneamine (25 g) was added to a 300 ml flask.

Salicylic acid (0.4 g) was added followed by acetonitrile (100 g). The mixture was stirred while phenyl glycidyl ether (102.2 g) was added via an addition funnel over a period of 2 hours. The reaction was stirred at room temperature overnight. The formation of a white suspension was observed. The temperature was raised to 60° C. for five hours to complete the reaction. The solvent was removed from the mixture and a viscous mass was isolated. LC-MS analysis indicates essentially quantitative conversion to product.

Example 9

Under a nitrogen atmosphere 29.5 g of 2,-(5,6)-norbornane-methaneamine-n-propaneamine was added into a 300 ml flask. To this was added 0.4 g of salicylic acid. Acetonitrile (100 g) was added and the mixture was agitated. Phenyl glycidyl ether (102.2 g) was added via an additional funnel during a 2 hour period. The reaction was stirred for additional 18 hours at room temperature followed by 5 hours at 60° C. A suspension was observed. The solvent was removed in vacuo and the product, compound (X) isolated as a viscous colorless liquid (98.6 g). Analysis by LC/MS indicates essentially complete conversion to product.

Example 10

At room temperature and under a nitrogen atmosphere, n-butyl glycidyl ether was added dropwise to 3,8-(4,8)-dimethaneamine-tricyclo[5.2.1.0]decane (4.3:1 mol—butyl glycidyl ether 4.3 mol) in a flask equipped with a condenser. Thereafter, the reaction was slowly heated to 80° C. After heating for 4 hours and allowing the reaction mixture to further mix at room temperature for 48 hours, GC-analysis showed the complete disappearance of the starting diamine. Compound of Formula XII was isolated as a viscous clear liquid.

Example 11–15

Coatings Testing Procedure

The following test procedures were used for generating data reported in the examples below:

Persoz Hardness Test

The change in film hardness of the coating was measured with respect to time by using a Persoz hardness tester Model No. 5854 (ASTM D4366) supplied by BYK-Mallinckrodt, Wallingford Conn. The number oscillations (referred to as Persoz number) were recorded.

Hardness (Fischer)

Hardness was measured using a Fischerscope® hardness tester (the measurement is in Newtons per square millimeter).

Swell Ratio

The swell ratio of a free film (removed from a sheet of TPO—thermoplastic olefin) was determined by swelling the film in methylene chloride. The free film was placed between two layers of aluminum foil and using a LADD punch, a disc of 3.5 mm in diameter was punched out of the film and the foil was removed from the film. The diameter of the unswollen film ($D_o$) was measured using a microscope with a 10× magnification and a filar lens. Four drops of methylene chloride were added to the film and the film was allowed to swell for a few seconds and then a glass slide was placed over the film and the swollen film diameter ($D_s$) was measured. The swell ratio was calculated as follows:

$$\text{Swell Ratio} = (D_o)^2/(D_s)^2$$

Coating compositions of Examples 11 through 15 were prepared as follows:

|  | Example 11 | Example 12 | Example 13 | Example 14 | Example 15 |
|---|---|---|---|---|---|
| Portion 1 | | | | | |
| Constituents of the Composition | | | | | |
| Compound V | 21.921 | | | | |
| Compound XI | | 22.447 | | | |
| Compound VIII | | | 23.243 | 8.286 | |
| Compound IX | | | | | 9.910 |
| Acrylic Polymer (1) | | | | 55.618 | 66.515 |
| Additives Solution | 11.636 | 11.599 | 11.605 | 10.122 | 10.122 |
| Propylene Glycol Methyl Ether | | | 20.000 | 20.000 | |
| Propylene Glycol Methyl Ether Acetate | 89.963 | 90.384 | 12.826 | 32.792 | 56.509 |
| Portion 2 | | | | | |
| Des N-3300 (2) | 47.437 | 46.872 | 46.314 | 25.614 | 19.930 |
| Des Z-4470 BA (3) | 29.043 | 28.698 | 28.356 | 15.682 | 12.202 |
| Propylene Glycol Methyl Ether Acetate | 0.000 | 0.000 | 57.657 | 31.887 | 24.811 |
| Total = | 200.000 | 200.000 | 200.000 | 200.000 | 200.000 |

-continued

| Constituents of the Additives Solution | |
|---|---|
| Tinuvin 384 (4) | 8.1137 |
| Tinuvin 292 (5) | 7.7079 |
| Byk 333 (6) | 0.7708 |
| Byk 358 (7) | 6.1665 |
| 2% DBTDL in ethyl acetate (8) | 5.7810 |
| 10% acetic acid in methyl amyl ketone | 23.1240 |
| Propylene Glycol Methyl Ether Acetate | 48.3361 |

(1) Acrylic polymer - 58% solids in organic solvents of an acrylic polymer of S/MMA/IBMA/HEMA having an Mn of 6200 and Mw of 12,000 and prepared according to Example (Col. 5) of U.S. Pat. No. 5,314,953.
(2) Desmodur ® Z 4470 BA from Bayer Polymers.
(3) Desmodur ® N-3300A from Bayer Polymers.
(4) Tinuvin ® 384 UVa light stabilizer from Ciba Specialty Chemicals Corp.
(5) Tinuvin ® 292 hindered amine light stabilizer from Ciba Specialty Chemicals Corp.
(6) Byk ® 333 - flow additive from Byk-Chemie.
(7) Byk ® 358 - flow additive from Byk-Chemie.
(8) DBTDL - Fascat ® 4202 from Atofina Chemicals, Inc.

For each of Examples 11 through 15, the constituents of the Premix Solution were charged into a mixing vessel in the order shown above and mixed. Next, the constituents of Portion 1 were charged into another mixing vessel in the order shown above and mixed, then Portion 2 was premixed and charged into the mixing vessel and thoroughly mixed with Portion 1 to form each of Examples 11 through 15. Then each of the coating compositions was applied by spraying onto a cold roll steel panel to a dry coating thickness of approximately 2 mils and air dried at ambient temperature conditions.

The coatings were cured under ambient conditions for 3 to 7 days with periodic testing. Finally, the coatings were cured at 130° C. for one hour. After the final cure, the coatings were tested again to determine the final potential properties of the coating compositions. The results of the ambient and final property tests are shown in the following table. The film hardness is an indication of when the coating film is ready to be sanded, buffed or polished. The goal is a Persoz hardness of at least 30 sec (counts) as taught by U.S. Pat. No. 5,314,953.

Properties of Coating Compositions of Examples 11–15.

| | Example 11 | Example 12 | Example 13 | Example 14 | Example 15 |
|---|---|---|---|---|---|
| Hardness (Persoz) | | | | | |
| 4 hrs. | | | 75 | 46 | 36 |
| 5.5 hrs. | 59 | 60 | | | |
| 1 day | 113 | 76 | 98 | 100 | 129 |
| 3 days | | | 104 | 221 | 202 |
| After Final Bake | | | 221 | 309 | 231 |
| Hardness (Fisher) | | | | | |
| 1 day | 108 | 40 | 21 | 39 | 28 |
| 3 days | | | 24 | 83 | 82 |
| 7 days | 100 | 45 | | | |
| After Final Bake | 116 | 136 | 145 | 159 | 168 |

-continued

| | Example 11 | Example 12 | Example 13 | Example 14 | Example 15 |
|---|---|---|---|---|---|
| Swell Ratio | | | | | |
| 1 day | 1.60 | 1.40 | 1.37 | 1.60 | 1.82 |
| 3 days | | | 1.35 | 1.54 | 1.73 |
| After Final Bake | 1.36 | 1.35 | 1.35 | 1.51 | 1.60 |

All coating compositions have reached a level of hardness greater than 60 Persoz counts within 6 hours, all coating compositions are showing that they have reached a high degree of cure next day as evidenced by 1 day Swell Ratio values versus the Final (After Bake) Swell Ratio.

What is claimed is:

1. A coating composition comprising a film forming binder and an organic liquid carrier wherein the binder comprises a nucleophilic component and an electrophilic component wherein said nucleophilic component comprises an alkoxylated amine and said electrophilic component comprises an organic polyisocyanate;

said alkoxylated amine has the Formula (I)

(A)[N(R$^1$H)$_2$]$_p$;  Formula (I)

wherein p is a number from 2 to 6;

wherein each R$^1$ is independently [—CHR$^2$—CHR$^3$—O—]$_n$ with n equal to 1, 2, 3 or 4;

wherein (A) is a cycloaliphatic fragment having the formula of:

(i) Formula (II), (ii) Formula (III), or (iii) mixtures of Formula (II) and Formula (III);

wherein Formula (II) and Formula (III), resrpectively, are:

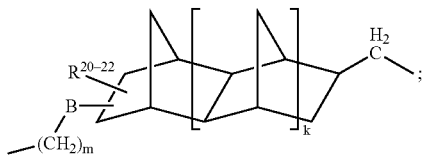

(II)

the exact point of attachment and orientation of the —$CH_2$— group (which also connects to an amine nitrogen atom in Formula (I)) and the $R^{20}$, $R^{21}$, and $R^{22}$ groups to the norbornane skeleton can vary and mixtures of compounds and isomers are commonly utilized by this invention;

the —$(CH_2)_m$— group in Formula (II) attaches to an amine nitrogen atom in Formula (I);

k equals 0, 1 or 2 and, when k equals 1 or 2, the additional bridging $CH_2$ group(s) may be on the same or opposite side with respect to the first bridging $CH_2$ group;

B=(—$(CH_2)_t$—(CH)—$(CH_2)_s$—)$_r$, r=0 or 1, s+t=1 to 16, the —(CH)— group also connects to —$(CH_2)_m$—; when r=1, B forms a ring connecting to the norbornane skeleton in place of one of $R^{20}$, $R^{21}$ or $R^{22}$;

$R^{20}$, $R^{21}$, and $R^{22}$ can be the same or different and are each independently H, a $C_1$ to $C_{20}$ alkyl group, or a phenyl group; and m=1, 2, 3, or 4;

Formula (III) has the structure of

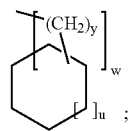

(III)

the exact point of attachment to the cycloaliphatic ring and the orientation of each —$(CH_2)_y$— group, each of which also connects to an amine nitrogen atom, with respect to each other can vary;

u=1–11;
w=2–6;
y=0–5; and
if u=1, w=2, y≠1; and
if u=1, w=2, y=0, $R^2$ or $R^3$ or both cannot be H, $CH_3$, $C_2H_5$, $CH_2(CH_2)_kCH_3$ with k=1–5, or $C_6H_{11}$;
and wherein; and $R^2$ and $R^3$ are each independently H, a $C_1$ to $C_{20}$ alkyl group, a phenyl group, a $C_6$ to $C_{20}$ aryl group substituted with a $C_1$–$C_{12}$ alkyl group, a —$CH_2$—O—$R^4$ group with $R^4$ equal to a $C_1$–$C_{12}$ alkyl group or a phenyl group, or $R^2$ and $R^3$ are connected and form a cycloaliphatic group by an alkylene chain (—$(CH_2)_q$—, q=3 to 16).

2. The composition of claim 1 wherein said nucleophilic component further comprises an acrylic polymer or an ester oligomer.

3. The composition of claim 1 further comprising an a effective amount of catalyst to cure said composition at ambient temperature.

4. The composition of claim 2 further comprising an effective amount of catalyst to cure said composition at ambient temperature.

5. The composition of claim 3 wherein said composition is a two-pack composition.

6. The composition of claim 4 wherein said composition is a two-pack composition.

7. The composition of claim 5 or 6 wherein said composition is a clearcoat for automotive refinishing.

8. The composition of claim 7 wherein (A) is Formula (II)

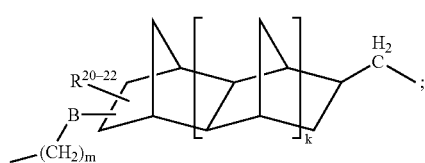

(II)

wherein p in Formula (I) is equal to 2;

wherein the exact point of attachment and orientation of the —$CH_2$— group (which also connects to an amine nitrogen atom in Formula (I)) and the $R^{20}$, $R^{21}$, and $R^{22}$ groups to the norbornane skeleton can vary and mixtures of compounds and isomers are commonly utilized by this invention;

wherein the —$(CH_2)_m$— group in Formula (II) attaches to an amine nitrogen atom in Formula (I);

wherein k equals 0, 1 or 2 and, when k eauals 1 or 2, the additional bridging $CH_2$ group(s)of Formula (II) may be on the same or opposite side with respect to the first bridging $CH_2$ group;

wherein B is (—$(CH_2)_t$—(CH)—$(CH_2)_s$—)$_r$, r=0 or 1, s+t=1 to 16, and wherein the —(CH)— group also connects to —$(CH_2)_m$—; when r=1, B forms a ring connecting to the norbornane skeleton in place of one of $R^{20}$, $R^{21}$ or $R^{22}$;

$R^{20}$, $R^{21}$, and $R^{22}$ can be the same or different and are each independently H, a $C_1$ to $C_{20}$ alkyl group, or a phenyl group; and m=1, 2, 3, or 4.

9. The composition of claim 8 wherein Formula (II) is:

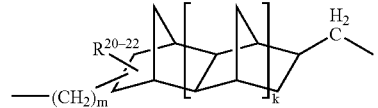

where r=0 and m=1, 2, or 3.

10. The composition of claim 9 wherein said alkoxylated amine is selected from:

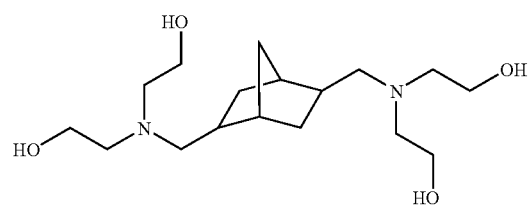

(V)

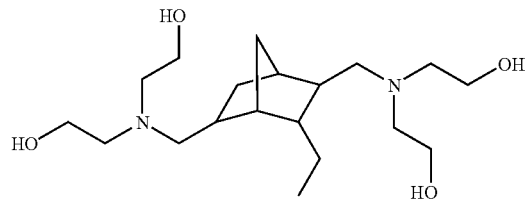
(VI)
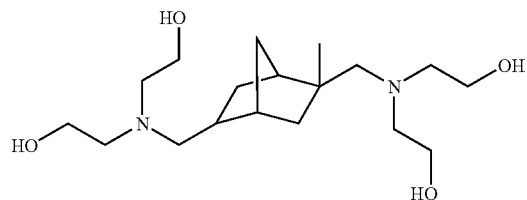
(VII)
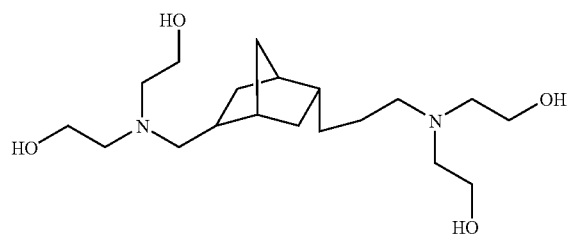
(VIII)
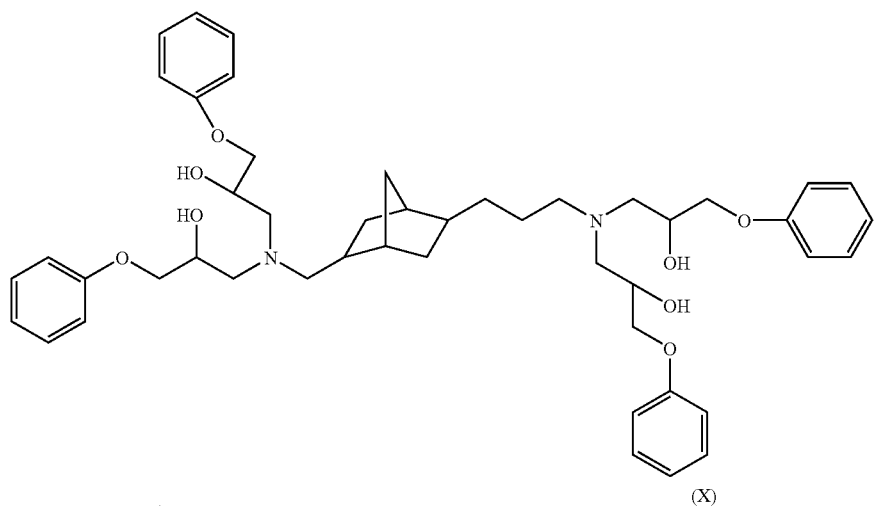
(IX)
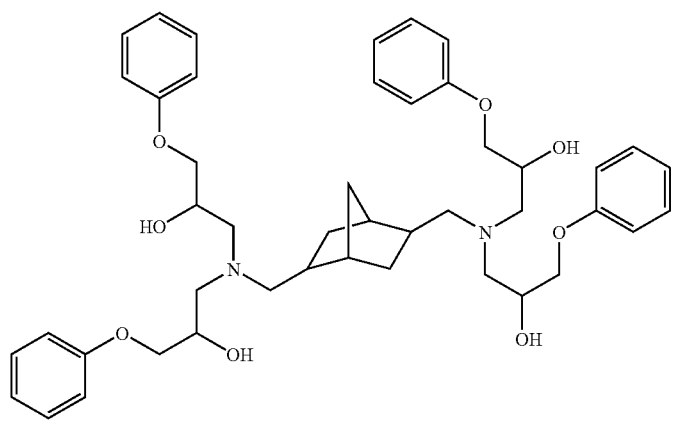
(X)
or mixtures of two or more thereof.

11. The composition of claim 8 wherein Formula (II) has the formula of

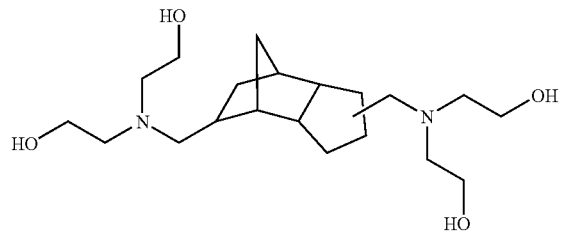
(XI)

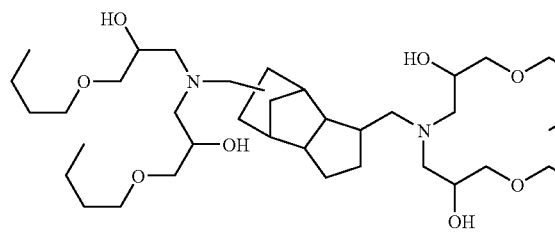
(XII)

or mixtures of two or more thereof.

12. The composition of claim 7 wherein (A) is Formula (III).

13. The composition of claim 12 wherein said alkoxylated amine is selected from

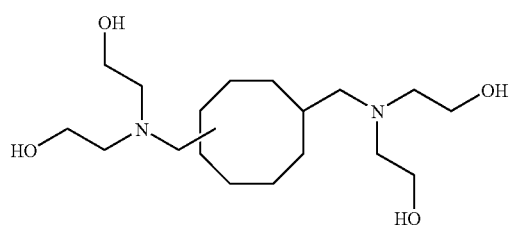
(XIII)

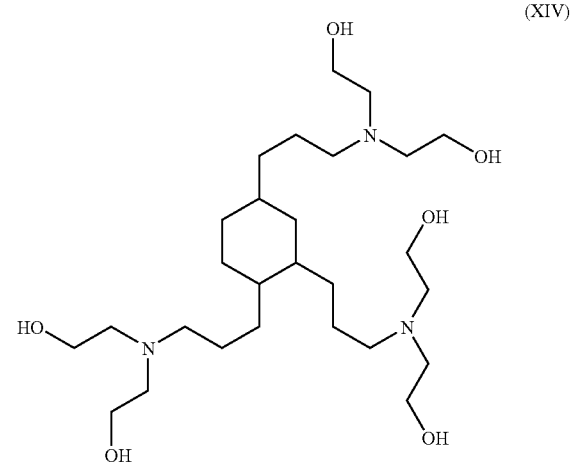
(XIV)

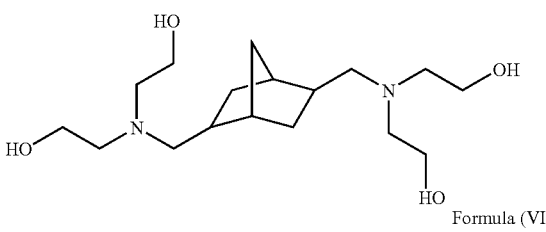
(XV)

or mixtures of two or more thereof.

14. The composition of claim 8 wherein said alkoxylated amine is either one of

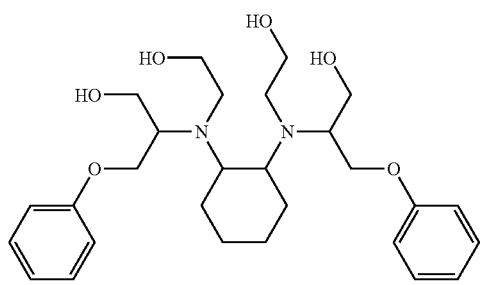
Formula (V)

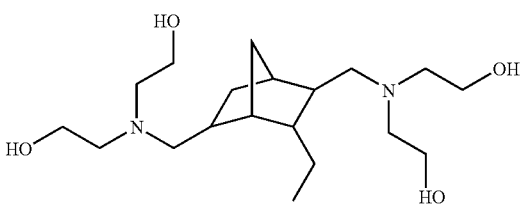
Formula (VI)

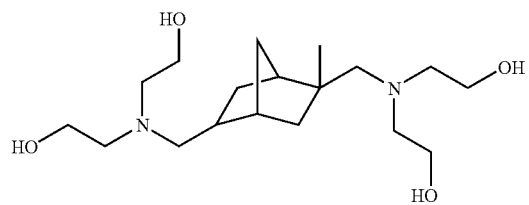
Formula (VII)

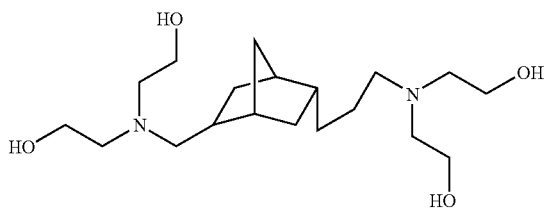
Formula (VIII)

Formula (IX)
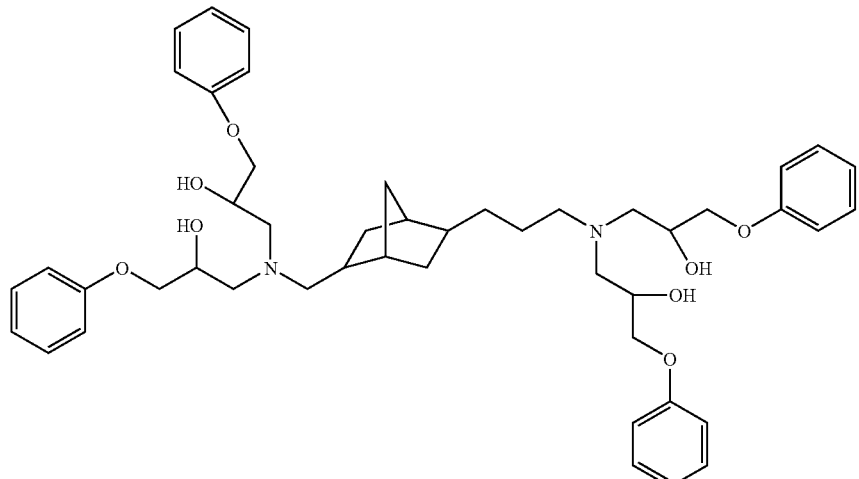
Formula (X)
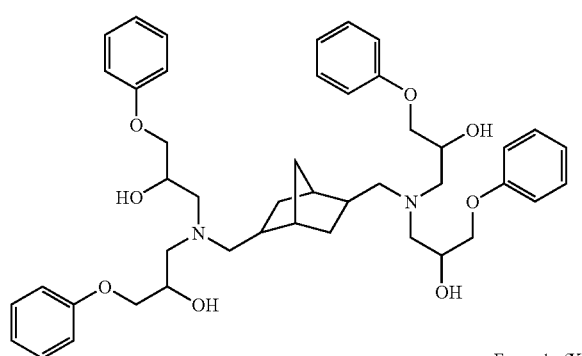
Formula (XI)
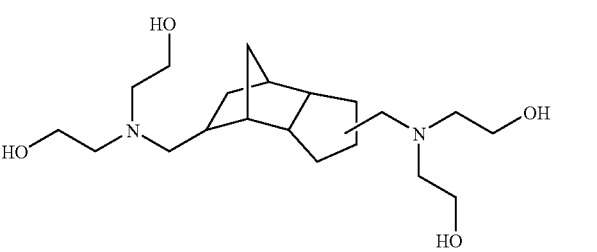
Formula (XII)
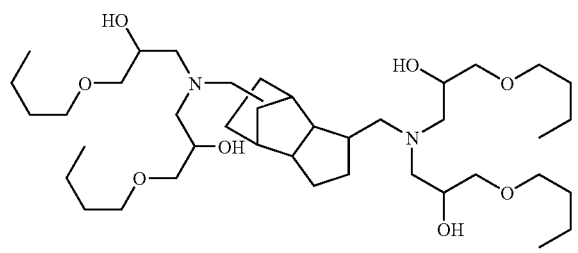
Formula (XIII)
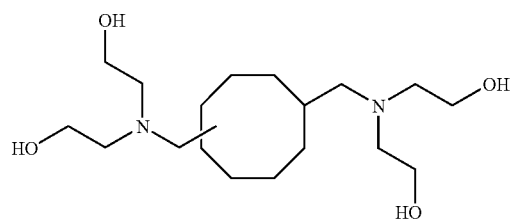
Formula (XIV)
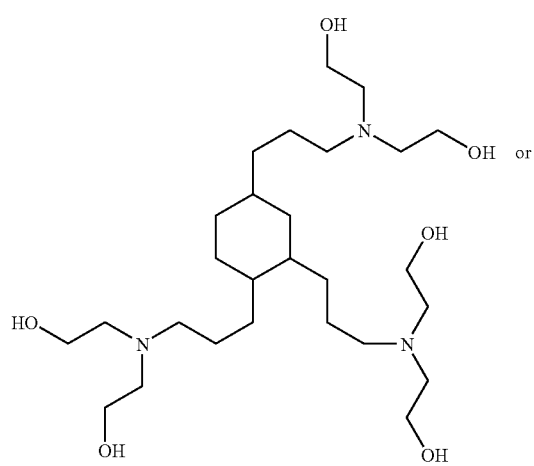 or
Formula (XV)
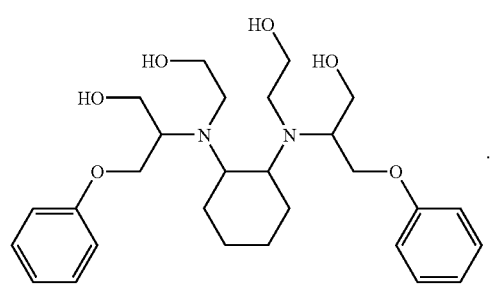
* * * * *